United States Patent [19]

Padilla

[11] Patent Number: 4,822,076
[45] Date of Patent: Apr. 18, 1989

[54] UNIVERSAL COUPLING FOR A FAUCET

[75] Inventor: James M. Padilla, Covina Heights, Calif.

[73] Assignee: Cuno, Incorporated, Meriden, Conn.

[21] Appl. No.: 126,235

[22] Filed: Nov. 27, 1987

[51] Int. Cl.$^4$ ............................................. F16C 21/00
[52] U.S. Cl. ........................................ 285/8; 285/404
[58] Field of Search .................................. 285/8, 404

[56] References Cited

U.S. PATENT DOCUMENTS

| | | |
|---|---|---|
| 778,491 | 12/1904 | Hull ........................................ 285/8 |
| 1,292,524 | 1/1919 | Serrell .................................... 285/8 |
| 1,722,960 | 7/1929 | Funston ............................. 285/8 X |
| 1,724,131 | 8/1929 | Gavaza .................................. 285/8 |
| 1,734,757 | 11/1929 | Ashley .................................. 285/8 |
| 1,946,832 | 2/1934 | Brandon ......................... 285/404 X |
| 2,219,813 | 10/1940 | Hooper .................................. 285/8 |
| 2,578,933 | 12/1951 | Hunter et al. ........................ 285/8 |
| 2,721,089 | 10/1955 | Shames .................................. 285/8 |
| 3,414,001 | 12/1968 | Woodford ........................ 285/8 X |
| 4,219,222 | 8/1980 | Brusadin ................................ 285/8 |

Primary Examiner—Thomas F. Callaghan
Attorney, Agent, or Firm—Michael E. Zall

[57] ABSTRACT

An universal coupling is described which can be connected to the outlet of a variety of water faucets regardless of the design or cross-sectional shape of the faucet outlet. In one embodiment the universal coupling can be connected a smaller faucet outlet having a maximum outlet width of about 60% of the maximum outlet width of the largest faucet outlet to which the universal coupling can be connected. The capability of the universal coupling of this invention to be connected to such a large variety of faucet outlets regardless of the cross-sectional shape thereof enables, for example, the installer of water filters to kitchen faucets to stock just the universal coupling of this invention since it will fit most all faucets commonly found in kitchens.

20 Claims, 1 Drawing Sheet

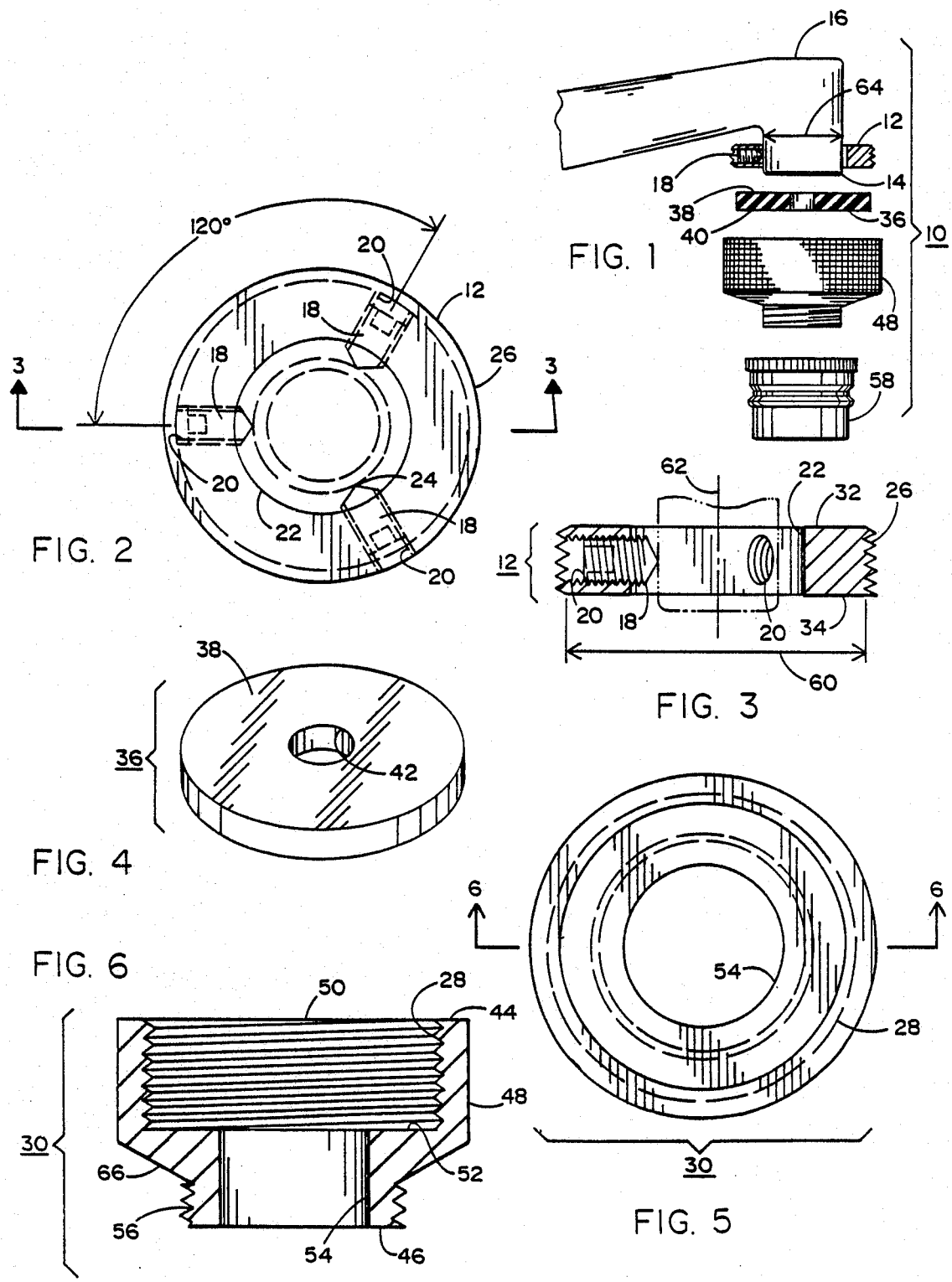

UNIVERSAL COUPLING FOR A FAUCET

BACKGROUND OF THE INVENTION

This invention is a coupling for attaching to the outlet of a kitchen faucet so that other devices can be quickly and easily connected to the outlet of the faucet. Examples of devices which are attached to faucet outlet are water purification apparatuses such as filters included activated carbon filters and filters having reverse osmosis modules. Because of the large variety of faucet designs it would be helpful to have a single coupling the upper end of which will be attached to a variety of faucet outlets regardless of the width or cross section thereof, hence an universal coupling. The lower end of such universal coupling can be adapted for a standard quick-connect fitting so that such water purification apparatuses when spent or depleted of water filtering capacity can be quickly replaced using hand power alone without the need of hand tools.

SUMMARY OF THE INVENTION

This invention is directed towards an universal coupling for attaching to the outlet of a variety of faucets including water faucets and especially the faucets of kitchen sinks. Water faucets are found in a variety of shapes and sizes. In order to provide a more pleasing ornamental design the outlet of some faucets have a noncircular cross section.

With the increasing demand for auxiliary water purification systems for use in homes and offices for water used for drinking or food prparation there is a need for an universal coupling operable for connecting such auxiliary water purification devices to the outlet of a variety of faucets so that a particular coupling designed for each faucet is not required. Accordingly, it is an object of this invention to provide an universal coupling which can be attached to the outlet of a variety of faucets so that specific couplings designed to fit each outlet are not required.

As used herein the term "maximum width" of the outlet of a faucet shall mean the maximum distance in cross section of a noncircular faucet outlet, or, in the case of a circular cross secton the outside diameter of the faucet outlet.

Another objective of this invention is to provide an universal coupling which can be fastened to the outlet of a variety of faucets wherein the smallest faucet outlet has a maximum width about 60% of the largest faucet outlet of such variety of faucets for which the universal coupling can be fastened. In one embodiment the maximum width of the smallest faucet outlet is about 70% of the largest faucet outlet for which the universal coupling of this invention can be used. In yet another embodiment the maximum width of the smallest faucet outlet is about 80% of the largest faucet outlet for which the universal coupling of this invention can be used.

Accordingly, there is provided by the principals of this invention an universal coupling operable for quick attachment to the outlet of a variety of faucets which comprises a collar having upper and lower surfaces, an outside cylindrical surface having external threads extending from the upper surface to the lower surface, a first bore extending centrally from the upper surface to the lower surface, wherein the first bore is operable for slipping over an outlet of a variety of faucets, and at least one internally threaded bore and screw therefor spaced between and away from the upper surface and the lower surface and extending from the outside cylindrical surface to the first bore, wherein, when the collar is slipped over such outlet, the screw for the at least one internally threaded bore is operable for screwing in the at least one internally threaded bore and thence against such outlet to rigidly fasten the collar to such outlet. The universal coupling also comprises an adapter having top and bottom outer surfaces, an outside surface therebetween, a recess in the top outer surface having a cylindrical side and a bottom, the cylindrical side having internal threads beginning at the top outer surface and an axis, the internal threads being operable for screwing onto the external threads of the collar, the bottom of the recess being an internal flat surface perpendicular to the axis of the cylindrical side of the recess, a passageway from the internal flat surface of the recess to the bottom outer surface of the adapter, a threaded part having threads beginning at the bottom outer surface, the threaded part being operable for screwing to a corresponding threaded part of a quick-disconnect fitting. The universal coupling further comprises sealing means having upper and lower surfaces and a central aperture therebetween and operable for seating over the internal flat surface of the recess of the adapter with the passageway thereof in communication with the central aperture of the sealing means, the sealing means for effecting a sealed fluid communication between the outlet of such variety of faucets and the passageway of the adapter by fastening the collar with the screw for the at least one internally threaded bore of the collar to the outlet of such variety of faucets, for seating the sealing means in the bottom of the recess over the internal flat surface of the adapter, and for screwing the internal threads of the adapter onto the external threads of the collar until the upper and lower surfaces of the sealing means are sufficiently compressed against the outlet of such variety of faucets and the internal flat surfaces of the recess of the adapter, respectively, to effect the sealed fluid communication.

In one embodiment of this invention wherein first bore of the collar has a given diameter, the faucet outlet has a maximum width from about 0.6 to about 0.999 of the given diameter of the first bore. In another embodiment the faucet outlet has a maximum width from about 0.7 to about 0.999 of the given diameter of the first bore. In still another embodiment such faucet outlet has a maximum width from about 0.8 to about 0.999 of the given diameter of the first bore.

In another embodiment of this invention the at least one internally threaded bore of the collar and screw therefor is at least three.

In still another embodiment of this invention wherein the external threads of the collar has a root diameter, and wherein the screw for the at least one internally threaded bore has a length, the length of the at least one internally threaded bore is such that the screw therefor can be positioned in the at least one internally threaded bore completely between the root diameter and the first bore.

In yet another embodiment of this invention the upper and lower surfaces of the sealing means are elastic. In a further embodiment the sealing means is made from an elastic substance, and preferably completely made from an elastic substance. In yet a further embodiment the sealing means is made from rubber.

There is also provided by the principals of this invention an universal coupling operable for quick attachment to the outlet of a variety of faucets wherein such outlet has an outside diameter from a minimum predetermined diameter to a maximum predetermined diameter, wherein the ratio of the maximum predetermined diameter to the minimum predetermined diameter of such outlet is at least about 1.4, the universal coupling comprising:

a collar having upper and lower surfaces, an outside cylindrical surface having external threads extending from the upper surface to the lower surface, a first bore extending centrally from the upper surface to the lower surface, wherein the first bore is operable for slipping over an outlet of a variety of faucets, wherein such outlet has an outside diameter from a minimum predetermined diameter to a maximum predetermined diameter, wherein the ratio of such maximum predetermined diameter to the minimum predetermined diameter is at least about 1.4, and at least one internally threaded bore and screw therefor spaced between and away from the upper surface and the lower surface and extending from the outside cylindrical surface to the first bore, the screw having a length operable for rigidly fastening the collar to the outlet of such variety of faucets, an adapter having top and bottom outer surfaces, an outside surface therebetween, a recess in the top outer surface having a cylindrical side and a bottom, the cylindrical side having internal threads beginning at the top outer surface and an axis, the internal threads being operable for screwing onto the external threads of the collar, the bottom of the recess being an internal flat surface perpendicular to the axis of the cylindrical side of the recess, a passageway from the internal flat surface of the recess to the bottom outer surface of the adapter, a threaded part having threads beginning at the bottom outer surface, the threaded part being operable for screwing to a corresponding threaded part of a quick-disconnect fitting; and sealing means having upper and lower surfaces and a central aperture therebetween an operable for seating over the internal flat surface of the recess of the adapter with the passageway thereof in communication with the central aperture of the sealing means, the sealing means for effecting a sealed fluid communication between the outlet of such variety of faucets to the passageway of the adapter by fastening the collar with the screw for the at least one internally threaded bore of the collar to the outlet of such variety of faucets, the sealing means also for seating the sealing means in said bottom of the recess over the internal flat surface of the adapter, and the sealing means further for screwing the internal threads of the adapter onto the external threads of the collar until the upper and lower surfaces of the sealing means are sufficiently compressed against the outlet of such variety of faucets and the internal flat surfaces of the recess of the adapter, respectively, to effect the sealed fluid communication.

In another embodiment of this invention the ratio of the maximum predetermined diameter to the minimum predetermined diameter of the outlet of such variety of faucets for which this invention is useful is at least about 1.7.

BRIEF DESCRIPTION OF THE DRAWINGS

FIG. 1 is an explosive side view of one embodiment of the universal coupling of this invention with the collar thereof attached to a faucet.

FIG. 2 is a top view of one embodiment of the collar of this invention and screw therefor attached to the outlet of a faucet shown as dotted lines.

FIG. 3 is a cross-sectional elevational view of the collar of FIG. 2 taken through line 3—3.

FIG. 4 is a perspective view of a washer for effecting a seal between the outlet of a faucet and the adapter of this invention.

FIG. 5 is a top view of one embodiment of the adapter for this invention.

FIG. 6 is a cross-sectional elevational view of the adapter of FIG. 5 taken through line 6—6.

DESCRIPTION OF THE PREFERRED EMBODIMENT

One embodiment of an universal coupling of this invention is shown in explosive view in FIG. 1. As can be seen from FIGS. 1 to 3, universal coupling 10 comprises collar 12, which is fastened to outlet 14 of water faucet 16 by screws 18 which are tightened in internally threaded bores 20. Collar 12 has central bore 22 which is large enough to allow the collar to be slipped over relatively wide outlets of water faucets typically used in basins and sinks of homes. Screws 18 are advanced inwardly towards the axis of the collar in internally threaded bores 20, preferably three in number and spaced radially about the collar preferably about 120 degrees apart, to rigidly fasten collar 12 to outlet 14 of the faucet. Preferably inner end 24 of screws 18 is pointed or otherwise shaped to improve the fastening of the collar to the faucet.

The outside of collar 12 is a cylindrical surface which contains external threads 26 which are operable for being received in internal threads 28 of adapter 30. Preferably collar 12 has a flat upper surface, 32, and a flat lower surface 34 which is parallel to upper surface 32. Collar 12 is preferably fastened to outlet 14 just slightly above the lower end thereof. Sealing means 36, preferably a washer made from an elastic material, the details of which are easily seen in FIG. 4, has upper surface 38, lower surface 40 which is parallel to upper surface 38, and central aperture 42 which passes completely through the thickness of washer 36. Preferably surfaces 38 and 40 of washer 36 are elastic and can be compressed between opposing surfaces of the faucet outlet and the adapter as will be explained below. In an especially prferred embodiment washer 30 is made completely from an elastic material, for example rubber.

Adapter 30 has top outer surface 44, bottom outer surface 46 and outside surface 48. Extending below surface 44 is cylindrical recess 50 which is bounded by internal threads 28 on the side and flat surface 52 on the bottom. Surface 52 acts as a seat for washer 36. Passageway 54, preferably a bore, extends centrally from internal flat surface 52 to bottom outer surface 46 of washer.

Adapter 30 also contains threaded part 56 having threads which begin at bottom outer surface 46. Threaded part 56 is for attaching a quick-disconnect fitting having threads corresponding to threaded part 56 to the adpter. Threaded part 56 is shown as external threads, however, it should be understood that internal threads on passageway 54 can be used if the quick-disconnect fitting has external threads. Preferably outside surface 48 is knurled or otherwise surfaced to provide a high friction surface for gripping by hand so that the adapter can be tightly screwed by hand without the use of a wrench onto collar 12. Since the adapter will be the part of the coupling most readily exposed to a viewer when the coupling is installed on a faucet such as those used in kitchen sinks, it is desirable to avoid scarring outside surface 48 with wrench marks or the like. Hence ease of attachment of the adapter to the collar by hand power alone is desirable. In a preferred embodiment outside surface 48 is knurled to prevent hand slippage when tightening the adapter on the collar.

It can be readily understood that by seating washer 36 onto internal flat surface 52 of adapter 30 and screwing threads 28 of adapter onto threads 26 of collar 12 that sealing means or washer 36 can be compressed tightly between outlet 14 of the faucet and surface 52 thereby effecting a sealed fluid communication between outlet 14 and passageway 54 by means of aperture 42.

The thickness of collar 12 between root diameter 60 and bore 22 is large enough to permit screw 18 to be advanced a considerable distance toward axis 62 of the collar thereby allowing the collar to be rigidly attached to faucets having outlets of relatively small maximum width 64. In one embodiment the thickness of the collar is such that screws 18 can be positioned in internally threaded bore 20 completely between the root diameter of threads 26 and bore 22.

In one embodiment of this invention external threads 26 on colar 12 are 1¼ inch—12 threads per inch UNF, first bore 22 is about 0.687 inches in diameter, and the thickness of the collar is about 0.250 inches. In a further embodiment the at least one internally threaded bore has No. 10—32 threads per inch UNF. In a still further embodiment the collar contains three such internally threaded bores 20 spaced about 120 degrees apart.

In one embodiment of this invention recess 50 of adapter 30 is about 0.4 inches deep and internal threads 28 are 1¼ inch —12 threads per inch UNF. In a further embodiment passageway 54 is a central boe of about 0.625 inches in diameter. In a still further embodiment the overall thickness of the adapter between top outer surface 44 and bottom outer surface 46 is about 0.8 inches. In yet another embodiment threads 56 are conventional water faucet serator attachment male threads 55/64 inch —27 threads per inch.

Aerators with snap fittings in a variety of sizes are sold by Wrightway Manufacture Company under the trademark Bubble-Stress. In one embodiment in which threads 56 are male 55/64 --27 threads per inch, Bubble-Stream model 1380KB serator with snap fitting is attached to threads 56. Pages 5 and 6 from the catalog of Bubble-Stress brand aerator with snap fittings is hereby incorporated herein by reference as example of serators with snap fittings that are useful with the universal coupling of this invention.

In one embodiment outside surface 48 is about 1.4 inches in diameter. In yet another embodiment adapter 30 contains conical chamfer 66. In a further embodiment chamfer 66 is about 60 degrees from the axis of the adapter.

In one embodiment collar 12 is brass. In one embodipment adapter 30 is a metal selected from the group consisting of brass, nickel or chrome plated brass, and stainless steel.

In one embodiment sealing means is a rubber washer having an outside diameter abou 1.125 inches, a thickness between surfaces 38 and 40 of about 0.19 inches, and central bore 42 about 0.28 inches.

While the preferred embodiments of the present invention have been described, it should be understood that various changes, adaptations and modifications may be made thereto without departing from the spirit of the invention and the scope of the appended claims. It should be understood, therefore, that the invention is not to be limited to minor details of the illustrated invention shown in the figures and that variations in such minor details will be apparent to one skilled in the art.

Therefore it is to be understood that the present disclosure and embodiment of this invention described herein are for purposes of illustration and example and that modifications and improvements may be made thereto without departing from the spirit of the invention or from the scope of the claims. The claims, therefore, are to be accorded a range of equivalents commensurate in scope with the advances made over the art.

What is claimed is:

1. An universal coupling operable for quick attachment to the outlet of a variety of faucets, said universal coupling comprising:

a collar having upper and lower surfaces, an outside cylindrical surface having external threads extending from said upper surface to said lower surface, a first bore extending centrally from said upper surface to said lower surface, wherein said first bore is operable for slipping over an outlet of a variety of faucets, and at least one internally threaded bore and screw therefor spaced between and away from said upper surface and said lower surface and extending from said outside cylindrical surface to said first bore, wherein, when said collar is slipped over such outlet, said screw for said at least one internally threaded bore is operable for screwing in said at least one internally threaded bore and thence against such outlet to rigidly fasten said collar to such outlet;

an adapter having top and and bottom outer surfaces, an outside surface therebetween, a recess in said top outer surface having a cylindrical side and a bottom, said cylindrical side having internal threads beginning at said top outer surface and an axis, said internal threads being operable for screwing onto said external threads of said collar, said bottom of said recess being an internal flat surface perpendicular to said axis of said cylindrical side of said recess, a passageway from said internal flat surface of said recess to said bottom outer surface of said adapter, a threaded part having threads beginning at said bottom outer surface, said threaded part being operable for screwing to a corresponding threaded part of a quick-disconnect fitting; and sealing means having substantially flat upper and lower surfaces and a central aperture therebetween and operable for seating over said internal flat surface of said recess of said adapter with said passageway thereof in communication with said central aperture of said sealing means, said sealing means for effecting a sealed fluid communication between the outlet of such variety of faucets and said passageway of said adapter by fastening said collar with said screw for said at least one internally threaded bore of said collar to the outlet of such variety of faucets, seating said sealing means in said bottom of said recess over said internal flat surface of said adapter, and screwing said internal threads of said adapter onto said external threads of said collar until said upper and lower surfaces of said sealing means are sufficiently compressed against the outlet of such variety of faucets and said internal flat surface of said recess of said adapter, respectively, to effect said sealed fluid communication.

2. The universal coupling of claim 1, wherein said first bore has a diameter, wherein such outlet has a maximum width from about 0.6 to about 0.999 of said diameter of said first bore.

3. The universal coupling of claim 1, wherein said first bore has a diameter, wherein such outlet has a maximum width from about 0.7 to about 0.999 of said diameter of said first bore.

4. The universal coupling of claim 1, wherein said first bore has a diamter, wherein such outlet has a maximum width from about 0.8 to about 0.999 of said diameter of said first bore.

5. The universal coupling of claim 1, wherein said at least one internally threaded bore and screw therefor is at least three.

6. The universal coupling of claim 1, wherein said external threads of said collar has a root diameter, and wherein said screw for said at least one internally threaded bore has a length such that said screw can be positioned in said at least one internally threaded bore completely between said root diameter and said first bore.

7. The universal coupling of claim 1, wherein said upper and lower surfaces of said sealing means are elastic.

8. The universal coupling of claim 1, wherein said sealing means is made from an elastic substance.

9. The universal coupling of claim 1, wherein said sealing means is made from rubber. STOPPED HERE 10. An universal coupling operable for quick attachment to the outlet of a variety of faucets wherein such outlet has an outside diameter from a minimum predetermined diameter to a maximum predetermined diameter, wherein the ratio of said maximum predetermined diameter to said minimum predetermined diameter of such outlet is at least about 1.4, said universal coupling comprising:
  a collar having upper and lower surfaces, an outside cylindical surface having external threads extending from said upper surface to said lower surface, a first bore extending centrally from said upper surface to said lower surface, wherein said first bore is operable for slipping over an outlet of a variety of faucets, wherein such outlet has an outside diameter from a minimum predetermined diameter to a maximum predetermined diameter, wherein the ratio of such maximum predetermined diameter to said minimum predetermined diameter is at least about 1.4, and at least one internally threaded bore and screw therefore spaced between and away from said upper surface and said lower surface and extending from said outside cylindrical surface to said first bore, said screw having a length operable for rigidly fastening said collar to the outlet of such variety of faucets;
  an adapter having top and bottom outer surfaces, an outside surface therebetween, a recess in said top outer surface having a cylindrical side and a bottom, said cylindrical side having internal threads beginning at said top outer surface and an axis, said internal threads being operable for screwing onto said external threads of said collar, said bottom of said recess being an internal flat surface perpendicular to said axis of said cylindrical side of said recess, a passageway from said internal flat surface of said recess to said bottom outer surface of said adapter, a threaded part having threads beginning at said bottom outer surface, said threaded part being operable for screwing to a corresponding threaded part of a quick-disconnect fitting; and
  sealing means having substantially flat upper and lower surfaces and a central aperture therebetween and operable for seating over said internal flat surface of said recess of said adapter with said passageway thereof in communication with said central aperture of said sealing means, said sealing means for effecting a sealed fluid communication between the outlet of such variety of faucets to said passageway of said adapter by fastening said collar with said screw for said at least one internally threaded bore of said collar to the outlet of such variety of faucets, seating said sealing means in said bottom of said recess over said internal flat surface of said adapter, and screwing said internal threads of said adapter onto said external threads of said collar until said upper and lower surfaces of said sealing means are sufficiently compressed against the outlet of such variety of faucets and said internal flat surfaces of said recess of said adapter, respectively, to effect said sealed fluid communication.

11. The universal coupling of claim 10, wherein the ratio of said maximum predetermined diameter to the minimum predetermined diameter of the outlet of such variety of faucets is at least about 1.7.

12. The universal coupling of claim 10, wherein said external threads of said collar and said internal threads of said adapter are conventional 1¼ inch diameter—12 threads per inch UNF.

13. The universal coupling of claim 12, wherein said at least one internally threaded bore and screw therefor of said collar are three in number and are spaced about 120 degrees apart and have conventional thread size No. 10–12 threads per inch UNF.

14. The universal coupling of claim 13, wherein said threaded part of said adapter has conventional water faucet serator attachment threads 55/64 inch diameter—27 threads per inch.

15. An universal coupling operable for quick attachment of the outlet of a variety of faucets, said universal coupling comprising:
  a collar constructed and arranged to attach externally to a size range of faucets with the end of the faucets extending below the collar comprising:
    a cylindrical disk having an axial bore therethrough;
    the axial circumference of said cylindrical bore being threaded along its entire length;
    at least one radial bore extending radially from the axial circumference to the axial bore of said cylindrical disk;
    said radial bore being threaded to receive a screw therein;
    a screw in at least one radial bore, the length of said screw being less than the radial distance from said axial circumference to said axial bore;
  an adapter comprising:
    a top and a bottom;
    fastening means disclosed at the bottom of said adapter to fasten devices to the bottom of said adapter;
    a first internally threaded bore extending into said adapter from the top thereof;

a second bore extending into said adapter from the bottom thereof in registration with said first internally threaded bore;

said second bore smaller than said first bore;

a flat surface formed at the intersection of said first and second bores in said adapter to position and support a sealing disk in said first bore;

a sealing disk comprising:
  a flat upper sealing surface;
  a flat lower sealing surface;
  a bore extending from said upper sealing surface to said lower sealing surface;
  said bore at said lower sealing surface in registration with said second bore in said adapter; and
  said bore in said upper sealing surface adapter to be in registration with the end of a faucet to which said collar is connected;

said external threads on said collar adapted to coact with said internal threads in said first internal threaded bore of said adapter to compress said sealing means between the end of a faucet in said collar and the flat surface in said adapter formed at the intersection of said first and second bore in said adapter to position and support said sealing disk in said first bore, to thereby provide a seal for fluids between the end of the faucet against which said first sealing surface is compressed and, the second bore and the adapter against which the second sealing surface is compressed.

16. The universal coupling of claim 15 wherein said first internally threaded bore and said second bore in said adpater are coaxial.

17. The universal coupling of claim 15 wherein the bore of said sealing disk is coaxial with the bore of said second bore in said adapter.

18. The universal coupling of claim 16 wherein said first and second bore of said adapter and said bore of said sealing means are coaxial.

19. The universal coupling of claim 15 wherein the length of said first internally threaded bore in said adapter is greater than the length of the axial bore of said collar and said sealing means to enable said adapter to be threaded over the top of said collar when in operative disposition.

20. The universal coupling of claim 15 wherein said adapter includes friction means on the external surface thereof to facilitate threading of said adapter with respect to said collar.

* * * * *